(12) United States Patent
Nicholls et al.

(10) Patent No.: US 9,775,042 B2
(45) Date of Patent: Sep. 26, 2017

(54) SECURE COMMUNICATION CONNECTION FORMATION

(71) Applicant: EMPIRE TECHNOLOGY DEVELOPMENT LLC, Wilmington, DE (US)

(72) Inventors: Michael John Nicholls, Freemans Reach (AU); Nathan Adler, Rose Bay (AU)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/974,993

(22) Filed: Dec. 18, 2015

(65) Prior Publication Data

US 2017/0180991 A1    Jun. 22, 2017

(51) Int. Cl.
```
H04W 12/08      (2009.01)
H04W 76/02      (2009.01)
H04W 12/06      (2009.01)
```

(52) U.S. Cl.
CPC .......... *H04W 12/08* (2013.01); *H04W 12/06* (2013.01); *H04W 76/02* (2013.01)

(58) Field of Classification Search
CPC ...... H04W 12/06; H04W 12/08; H04W 76/02
USPC ................. 455/41.2, 404.2, 410–411, 414.1, 455/418–420, 456.1
See application file for complete search history.

(56) References Cited

U.S. PATENT DOCUMENTS

| | | | |
|---|---|---|---|
| 7,427,926 B2 | 9/2008 | Sinclair et al. | |
| 7,907,901 B1 * | 3/2011 | Kahn | H04M 1/7253 455/41.1 |
| 8,155,121 B2 | 4/2012 | Gudan et al. | |
| 8,170,212 B2 | 5/2012 | Pering et al. | |
| 8,219,028 B1 | 7/2012 | Flamholz | |
| 9,185,100 B1 * | 11/2015 | Juels | H04W 4/023 |
| 2005/0212911 A1 | 9/2005 | Marvit et al. | |

(Continued)

FOREIGN PATENT DOCUMENTS

WO    2012125947 A2    9/2012

OTHER PUBLICATIONS

"http://en.wikipedia.org/wiki/Alice_and_Bob", accessed Dec. 18, 2015.

(Continued)

*Primary Examiner* — Michael Mapa
(74) *Attorney, Agent, or Firm* — Maschoff Brennan

(57) ABSTRACT

In some examples, method includes positioning a first electronic device in a target orientation with respect to a second electronic device and moving the first and second electronic devices in at least two degrees of freedom of motion while the first electronic device is maintained in the target orientation with respect to the second electronic device. The method may also include operating the first electronic device while the first and second electronic devices share a secure communication connection that is based on a first numerical value and a second numerical value. The first numerical value may be based on data that describes the movement of the first electronic device while maintained in the target orientation, and the second numerical value may be based on data that describes the movement of the second electronic device while the first electronic device is maintained in the target orientation.

29 Claims, 7 Drawing Sheets

(56) References Cited

U.S. PATENT DOCUMENTS

| | | |
|---|---|---|
| 2009/0168997 A1 | 7/2009 | Blythe |
| 2013/0102283 A1 | 4/2013 | Lau et al. |
| 2013/0116964 A1 | 5/2013 | Van Roermund et al. |
| 2013/0157562 A1* | 6/2013 | Urard .................... H04B 7/24 |
| | | 455/39 |
| 2014/0206288 A1* | 7/2014 | Liu ...................... H04W 12/04 |
| | | 455/41.2 |
| 2016/0092668 A1* | 3/2016 | Ding .................... H04W 12/06 |
| | | 726/4 |
| 2016/0105923 A1* | 4/2016 | Chen .................... H04W 88/02 |
| | | 455/41.2 |
| 2016/0128114 A1* | 5/2016 | Moy .................... H04W 12/06 |
| | | 455/434 |

OTHER PUBLICATIONS

"https://lacklustre.net/projects/crackle/", accessed Dec. 18, 2015.
"Bluetooth: With Low Energy Comes Low Security" Mick Ryan iSEC Partners, 2013.

\* cited by examiner

SECURE COMMUNICATION CONNECTION FORMATION

BACKGROUND

Unless otherwise indicated herein, the materials described herein are not prior art to the claims in the present application and are not admitted to be prior art by inclusion in this section.

Electronic devices are owned and used by most adults throughout the world. Communication between electronic devices, and in particular, secure communication may be a factor in utilizing electronic devices in a variety of contexts. A number of methods exist for establishing a secure communication connection, but many can be imitated, spoofed, and/or hacked from unwanted sources.

SUMMARY

Technologies described herein generally relate to secure communication connection formation.

In some examples, a method may include receiving a request to form a secure communication connection between a first electronic device and a second electronic device and sending an initial connection message from the first electronic device to the second electronic device. The method may also include creating a first timestamp of when the initial connection message is sent. The method may further include deriving a first numerical value based on data that describes motion of the first electronic device. The motion of the first electronic device may include at least two degrees of freedom of motion while the first electronic device is maintained in a target orientation with respect to the second electronic device. In some embodiments, the target orientation may include physical contact.

The method may also include obtaining a second numerical value based on data that describes motion of the second electronic device. The motion of the second electronic device may include at least two degrees of freedom of motion while the first electronic device is maintained in the target orientation with respect to the second electronic device. The method may also include forming the secure communication connection between the first electronic device and the second electronic device based on the first numerical value, the second numerical value, the first timestamp, and a second timestamp that signifies when the initial connection message is received by the second electronic device.

In some examples, a first electronic device may include an input device configured to receive a request to form a secure communication connection between the first electronic device and a second electronic device. The first electronic device may also include one or more motion sensors and one or more processors that are coupled to the input device and to the one or more sensors. The first electronic device may further include a non-transitory computer-readable medium that is coupled to the one or more processors and that includes computer-readable instructions stored thereon that are executable by the one or more processors to perform or control performance of operations. The operations may include, in response to the request to form the secure communication connection, an operation to determine a first numerical value based on data from the one or more motion sensors that describes motion of the first electronic device as the first electronic device is moved through at least two degrees of freedom of motion while maintained in a target orientation with respect to the second electronic device. In some embodiments, the target orientation may include physical contact.

The operations may additionally include an operation to receive a second numerical value from the second electronic device based on data that describes motion of the second electronic device including at least two degrees of freedom of motion while the first electronic device is maintained in the target orientation with respect to the second electronic device. The operations may further include an operation to form the secure communication connection between the first electronic device and the second electronic device based on the first numerical value and the second numerical value.

In some examples, various methods may include positioning a first electronic device in a target orientation with respect to a second electronic device and moving the first electronic device and the second electronic device in at least two degrees of freedom of motion while the first electronic device is maintained in the target orientation with respect to the second electronic device. The method may also include operating the first electronic device while the first electronic device and the second electronic device share a secure communication connection that is based on a first numerical value and a second numerical value. The first numerical value may be based on data that describes the movement of the first electronic device while maintained in the target orientation. The second numerical value may be based on data that describes the movement of the second electronic device while the first electronic device is maintained in the target orientation with respect to the second electronic device.

In some examples, a first electronic device may include an input device configured to receive a request to form a secure communication connection between the first electronic device and a second electronic device. The first electronic device may also include one or more motion sensors configured to sense motion of the first electronic device in at least two degrees of freedom of motion while the first electronic device is maintained in a target orientation with respect to the second electronic device. The one or more motion sensors may also be configured to convert the sensed motion into data that describes the sensed motion. The first electronic device may further include a communication device configured to communicate with the second electronic device and via which a secure communication connection is formed. The communication device may also be configured to receive a second numerical value based on data that describes motion of the second electronic device as the second electronic device is moved through at least two degrees of freedom of motion while the first electronic device is maintained in the target orientation with respect to the second electronic device. The first electronic device may also include one or more processors coupled to the input device, the one or more sensors, and the communication device. The one or more processors may be configured to perform or control performance of, in response to the request to form the secure communication connection, determine a first numerical value based on the data that describes the sensed motion. The one or more processors may additionally be configured to perform or control performance of, form the secure communication connection between the first electronic device and the second electronic device via the communication device based on the first numerical value and the second numerical value.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings. In the drawings:

DETAILED DESCRIPTION

Figure 1A:
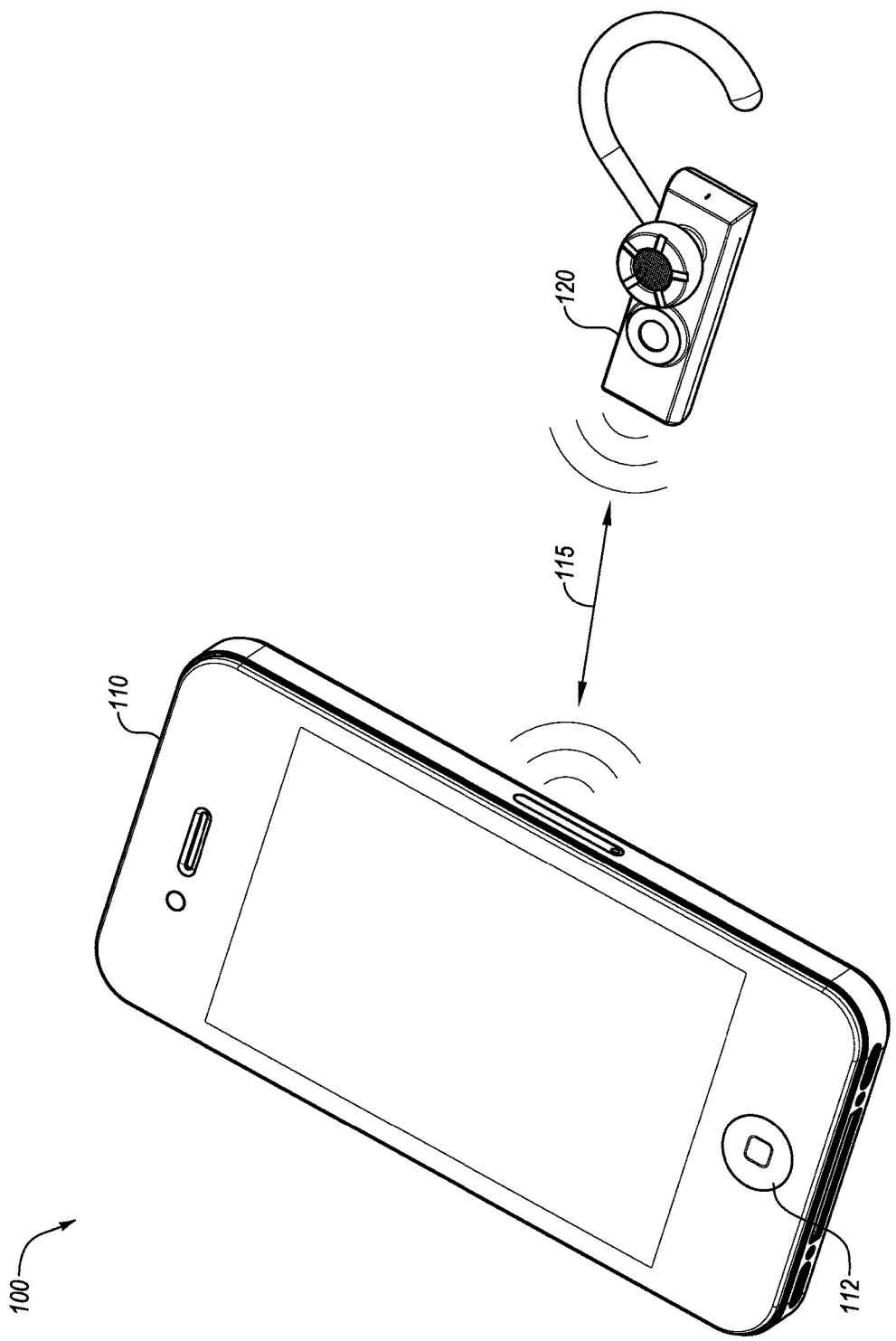
FIG. 1A illustrates an example system that is usable to form a secure communication connection.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, and devices that relate to secure communication connection formation. For example, to form a secure communication connection between a first electronic device and a second electronic device, the first electronic device and the second electronic device may create a timestamp of when the devices first acknowledged each other. The first and second electronic devices may be placed in a target orientation with respect to each other and moved together through a series of motions. Each device may derive a numerical value based on data that describes the motion of the respective devices and/or based on the elapsed time from when the devices first acknowledged each other until the motion starts. The numerical values of each device may be similar or identical, and may form at least part of the basis to establish the secure communication connection between the two electronic devices. The secure communication connection may also be based on the timestamp of when the electronic devices first acknowledged each other.

Reference is now made to the drawings.

FIG. 1A illustrates an example system 100 that is usable to form a secure communication connection, in accordance with at least some embodiments described in the present disclosure. The system 100 may include a first electronic device 110 and a second electronic device 120. The system 100 may be designed such that a secure communication connection 115 may be formed between the first electronic device 110 and the second electronic device 120. The secure communication connection 115 formed between the first electronic device 110 and the second electronic device 120 may be a wireless communication connection over which secure data may be communicated between the first electronic device 110 and the second electronic device 120.

In some embodiments, the secure communication connection 115 may be formed based on timing of events associated with the first electronic device 110 and the second electronic device 120, motion data of the first electronic device 110 or the second electronic device 120, numerical values derived based on motion of the first electronic device 110 or the second electronic device 120, or combinations thereof. Additionally or alternatively, the secure communication connection 115 may utilize one or more security keys like a public key or private key that may be based on any of the foregoing.

In some embodiments, the secure communication connection 115 may be based on when the first electronic device 110 and the second electronic device 120 first acknowledged each other. For example, the first electronic device 110 may broadcast a wireless signal to seek to form a communication connection with the second electronic device 120 and the second electronic device 120 may respond with an acknowledgment message. A timestamp of when the first acknowledgment occurs may be generated by the first electronic device 110 and the second electronic device 120. The timing of the first acknowledgment may be difficult to spoof, hack, or otherwise derive by a device that is not the first electronic device 110 or the second electronic device 120.

In some embodiments, the first acknowledgment may include when the first electronic device 110 and the second electronic device 120 first detect each other, and may not include the transmission of any particular messages in detecting each other. For example, if the first electronic device 110 is broadcasting a wireless signal and the second electronic device 120 is also broadcasting a wireless signal, the time of first acknowledgment may include when the first electronic device 110 detects the second electronic device 120 and when the second electronic device 120 detects the first electronic device 110.

Figure 1B:
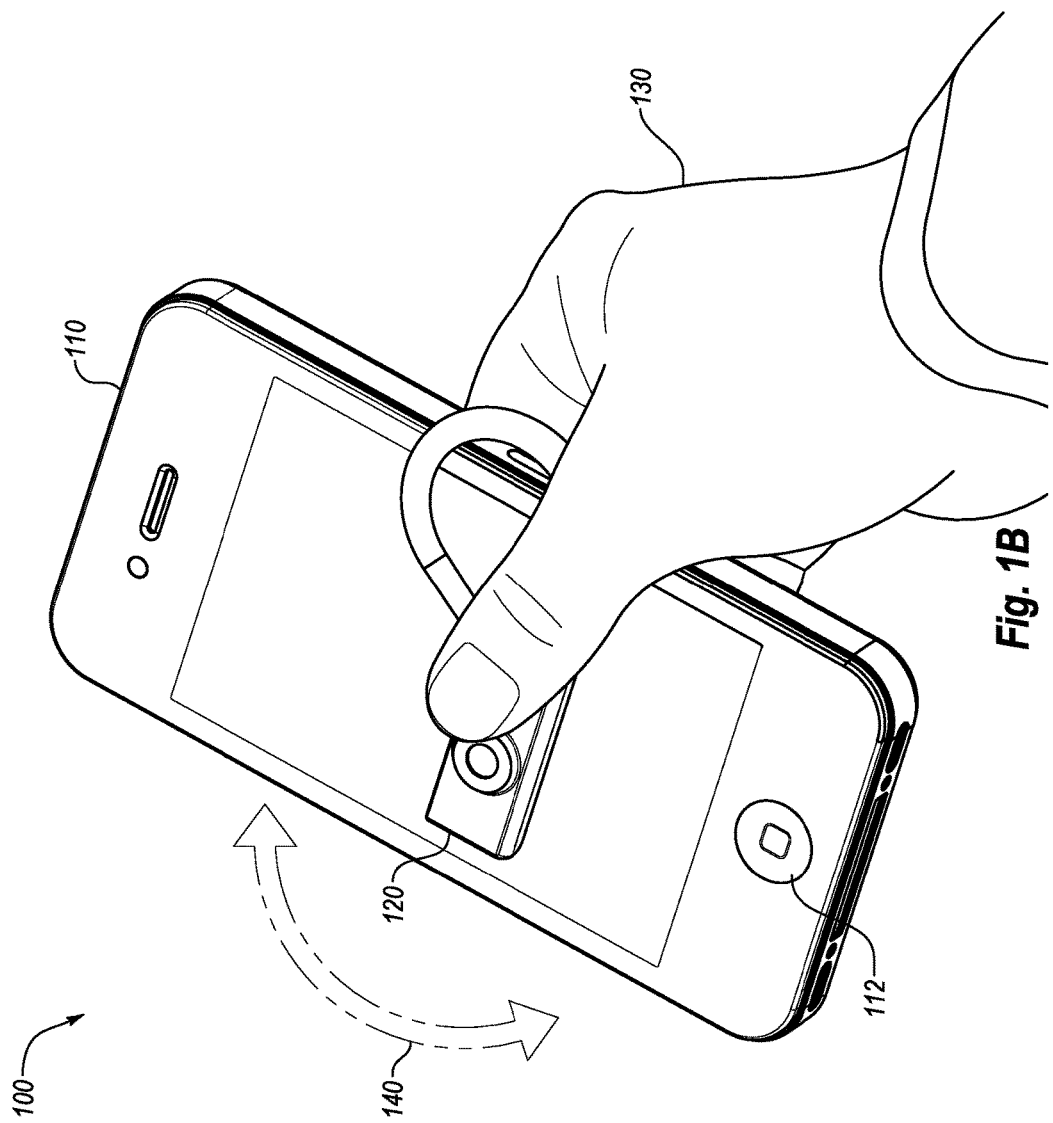
FIG. 1B illustrates an example of at least part of a method for the formation of a secure communication connection that uses the system of FIG. 1A.

In some embodiments, the secure communication connection may be based on motion of the first electronic device 110 or the second electronic device 120, and FIG. 1B illustrates one example of such an embodiment.

FIG. 1B illustrates an example of at least part of a method for the formation of a secure communication connection that uses the system 100 of FIG. 1A, in accordance with at least some embodiments described in the present disclosure. The first electronic device 110 may include an input device 112 by which a user 130 may request a secure communication connection to be formed between the first electronic device 110 and the second electronic device 120. After placement of the first electronic device 110 and the second electronic device 120 in a target orientation, the first electronic device 110 and the second electronic device 120 may be moved through a motion 140 that may be used in the formation of the secure communication connection.

By way of example, the user 130 may request the formation of the secure communication connection by invocation of the input device 112 before the first electronic device 110 and the second electronic device 120 are placed in the target orientation, or the user input device 112 may be invoked after. Additionally or alternatively, the first electronic device 110 and the second electronic device 120 may be configured to form a secure communication connection based on another trigger event and the input device 112 may not be utilized. For example, the first electronic device 110 may be configured to monitor for particular motions, ranges of motion, durations of motion, motions when in physical contact with another electronic device, and/or others, as a trigger event to form a secure communication connection (such as the secure communication connection 115 of FIG. 1A). The target orientation may include any of an alignment, angle, degree of rotation, physical contact, or others, or combinations thereof, of the first electronic device 110 with respect to the second electronic device 120. While illustrated in physical contact in the example of FIG. 1B, the first electronic device 110 and the second electronic device 120 may be maintained in the target orientation without physical contact in some other examples.

In some embodiments, after placement in the target orientation, the first electronic device 110 and the second electronic device 120 may be moved through the motion 140 while target orientation is maintained. The motion 140 may include at least two degrees of freedom of motion, or may include up to six degrees of freedom of motion, for example, motion in each of three Cartesian coordinate axes directions, and rotation about each of those coordinate axes. Additionally or alternatively, the first electronic device 110 and the second electronic device 120 may include multiple motion sensors such that more than three axes may be considered, for example, up to nine axes. For example, three motion sensors may each sense or monitor three axes.

After movement of the first electronic device 110 and the second electronic device 120 through the motion 140, the first electronic device 110 may utilize data that describes the motion 140 to generate a numerical value. For example, the first electronic device 110 may take data from one or more motion sensors of the first electronic device 110 and use a hash function, or other mathematical operation to derive a numerical value from the data that describes the motion 140. Similarly, the second electronic device 120 may utilize data that describes the motion 140 to generate a numerical value. In these and other embodiments, a certain amount of mathematical rounding may occur such that the numerical value of the first electronic device and the second electronic device may be identical, despite minor variations in underlying data. Such mathematical rounding may also be part of the hash function or other mathematical operation used.

In some embodiments, the manner in which the numerical values are derived may be normalized such that the derivation occurs in the same way on the first electronic device 110 and the second electronic device 120. In these and other embodiments, when the motion 140 of the first electronic device 110 and the second electronic device 120 is similar or identical, the respective numerical values derived by the first electronic device 110 and the second electronic device 120 may be equal or approximately equal. In some embodiments, the numerical values may be rounded to a target level of specificity based on the maintenance of sufficient security while the two numerical values may be approximately equal when the motion 140 of the first electronic device 110 and the second electronic device 120 is approximately equal.

In some embodiments, the motion 140 may include a threshold amount of motion, duration of motion, or range of motion. In these and other embodiments, the system 100 may wait to form a secure communication connection between the first electronic device 110 and the second electronic device 120 until the motion 140 exceeds the threshold. For example, if the threshold includes at least four degrees of motion and at least five seconds of motion, the first electronic device 110 and the second electronic device 120 may wait to derive the numerical values until after the motion 140 progresses through four degrees of motion and is at least five seconds in duration. In these and other embodiments, the numerical value based on the data that defines the motion 140 may be further combined with a timestamp of when the first electronic device 110 and the second electronic device 120 first acknowledged each other (described in greater detail with respect to FIG. 3) to derive a combined numerical value. The numerical values and the timestamp may be combined in any manner, such as hash function, an additive operation, or any other operation. Additionally or alternatively, the manner in which the numerical values and the timestamp are combined may be normalized such that the combination occurs in the same way on the first electronic device 110 and the second electronic device 120.

In some embodiments, any of the numerical value or the combined numerical value may be used in the formation of the secure communication connection. For example, the first electronic device 110 may replace a private key with the numerical value or the combined numerical value, and the private key may be used to form the secure communication connection. In other examples, some other value (e.g., an alphanumerical value that is different in some way from the numerical value or the combined numerical value) may be generated from the numerical value or the combined numerical value, and that other value may in turn be used as the private key or used in some manner to generate the private key.

Accordingly, the system 100 may be configured to form a secure communication connection between the first electronic device 110 and the second electronic device 120. Modifications, additions, or omissions may be made to the system 100 without departing from the scope of the present disclosure. For example, the system 100 may include any number of other components that may provide and support the operation of the system 100. Additionally, the visual depictions of the first electronic device 110 and the second electronic device 120 are merely for example purposes. For example, while the second electronic device 120 is depicted as a headset, either the first electronic device 110 or the second electronic device may be implemented as any of a variety of electronic device, such as, by way of example, a cell phone, a personal data assistant (PDA), a personal media player device, a wireless web-viewing device, a smart timekeeping device (e.g., watch), a personal headset device, an electronic pen, a camera, a shoe, sporting accessories, a speaker, a weight scale, a toothbrush, a keyboard, a mouse, an application-specific device, any other wearable device, or a hybrid device that includes functionality and features of any of the above devices.

Figure 2:
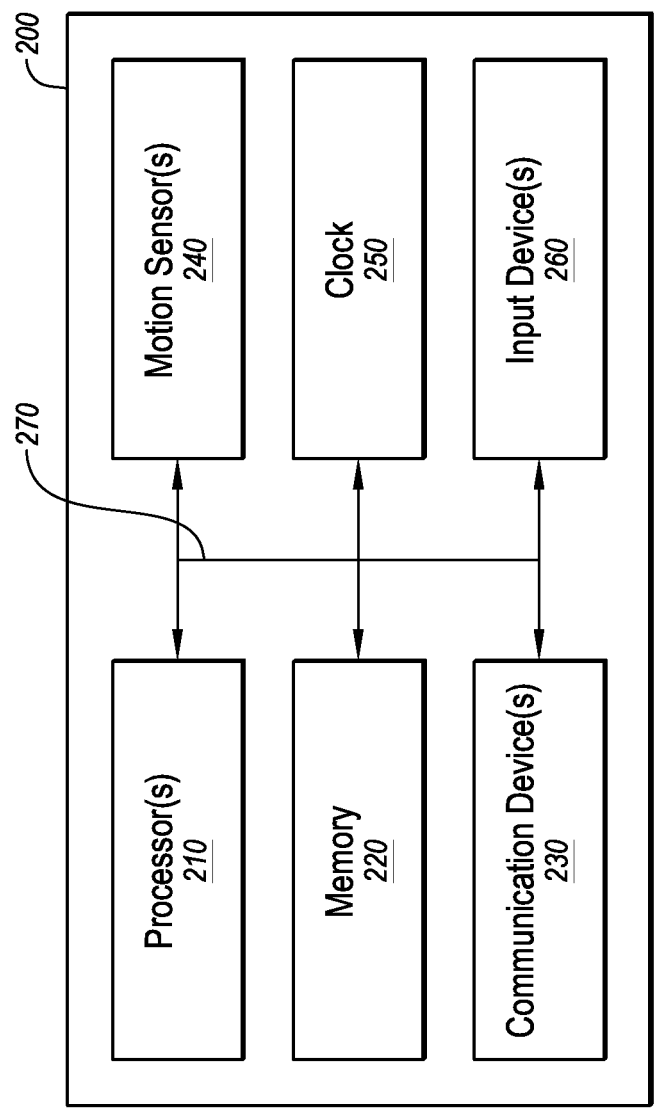
FIG. 2 is a block diagram that illustrates an example embodiment of a computation device to form a secure communication connection.

FIG. 2 is a block diagram that illustrates an example embodiment of a computation device 200 that is usable to form a secure communication connection, in accordance with at least some embodiments described in the present disclosure. The computation device 200 may include one or more processors 210 (which may be referred to as the processor 210), memory 220, one or more communication devices 230 (which may be referred to as the communication device 230), one or more motion sensors 240 (which may be referred to as the motion sensor 240), a clock 250, and one or more input devices (which may be referred to as the input device 260). In some embodiments, any or all of the components of the computation device 200 (e.g., the processor 210, memory 220, communication device 230, motion sensor 240, clock 250, and/or input device 260) may be in communication with each other, such as being coupled together by a bus 270. The computation device 200 may be implemented as the first electronic device 110 and/or the second electronic device 120, in some embodiments.

Figure 3:
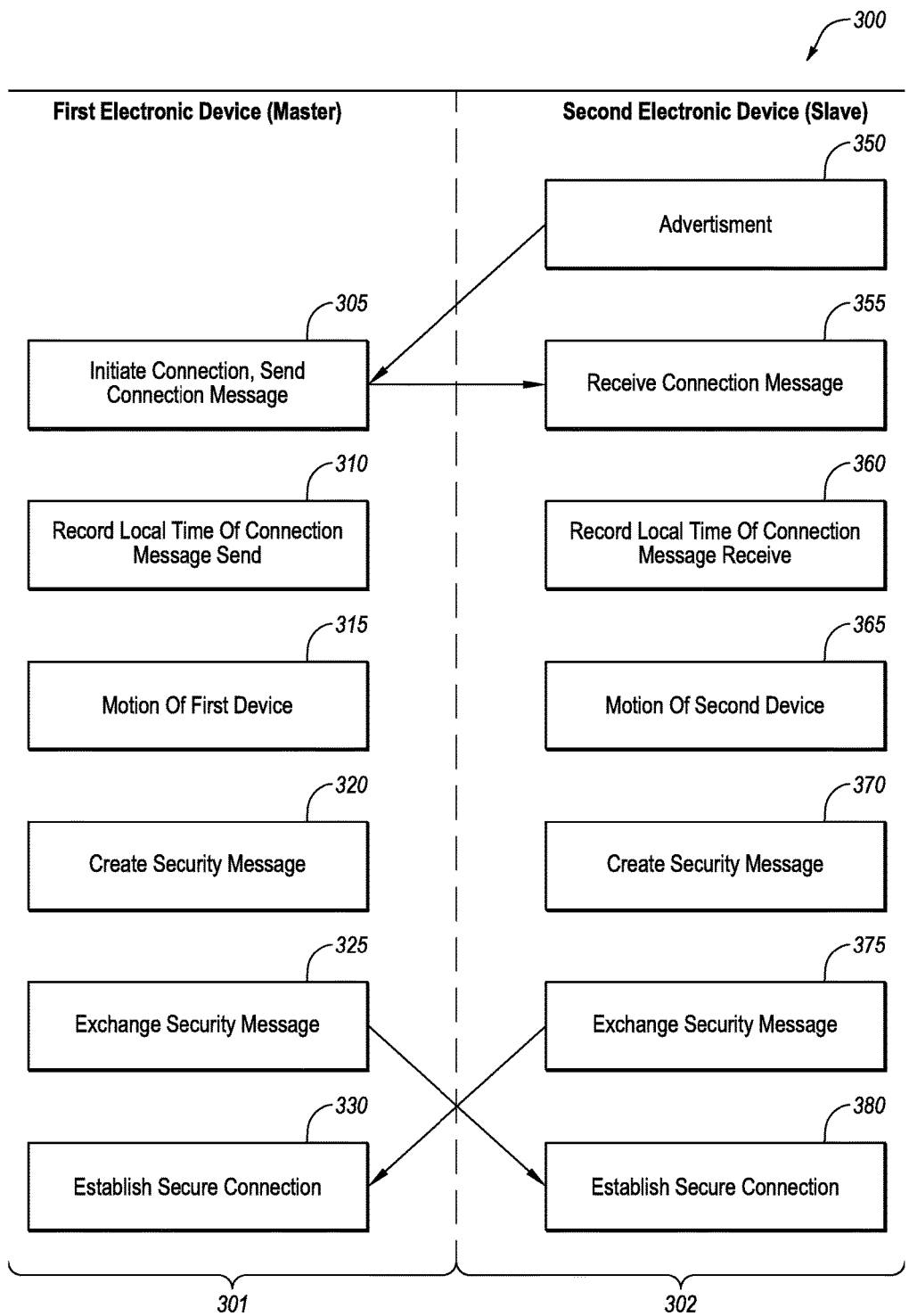
FIG. 3 illustrates an example swimlane diagram of a method to form a secure communication connection.
Figure 4:
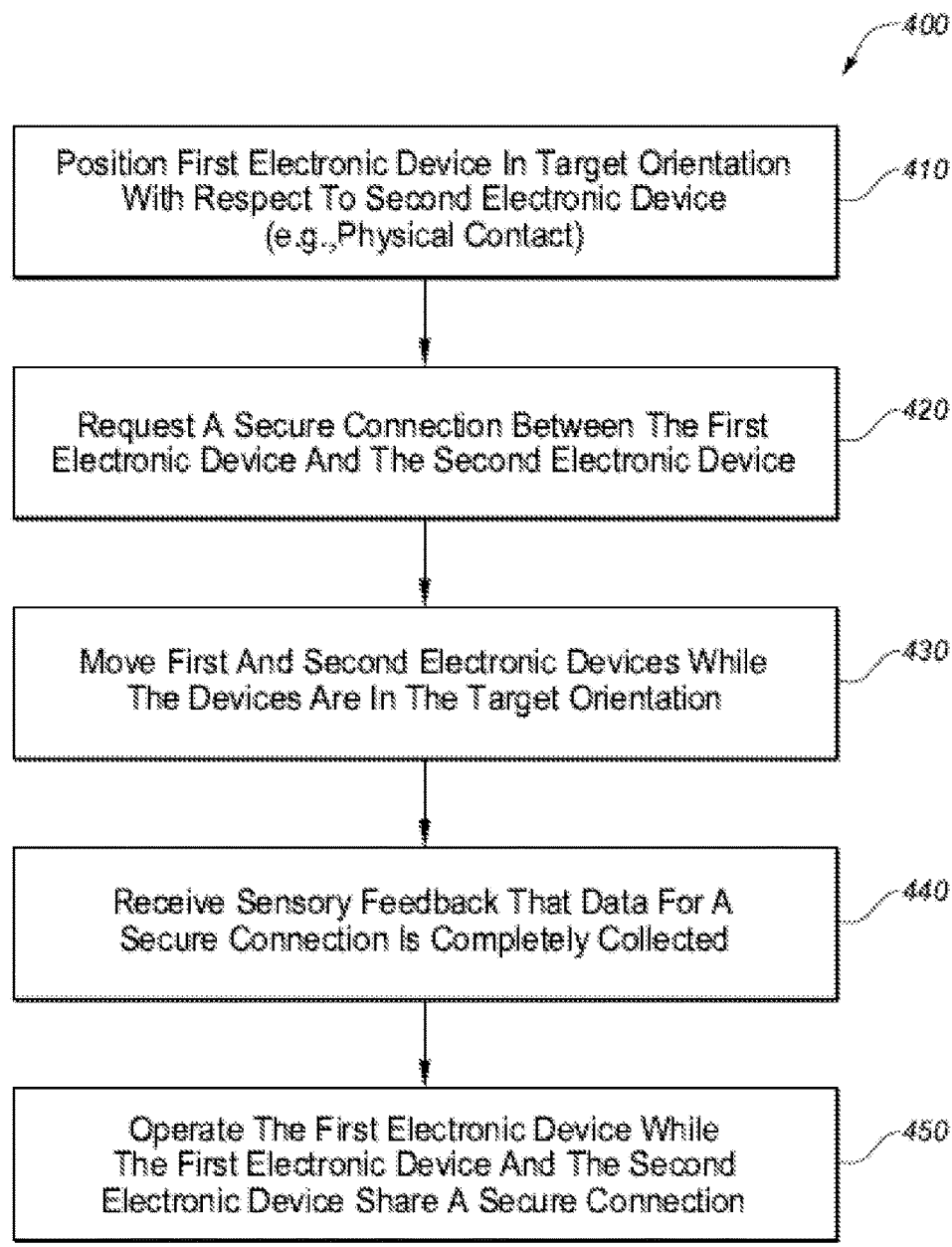
FIG. 4 illustrates an example flow diagram of example operations that may be performed by a user in the formation of a secure communication connection.
Figure 5:
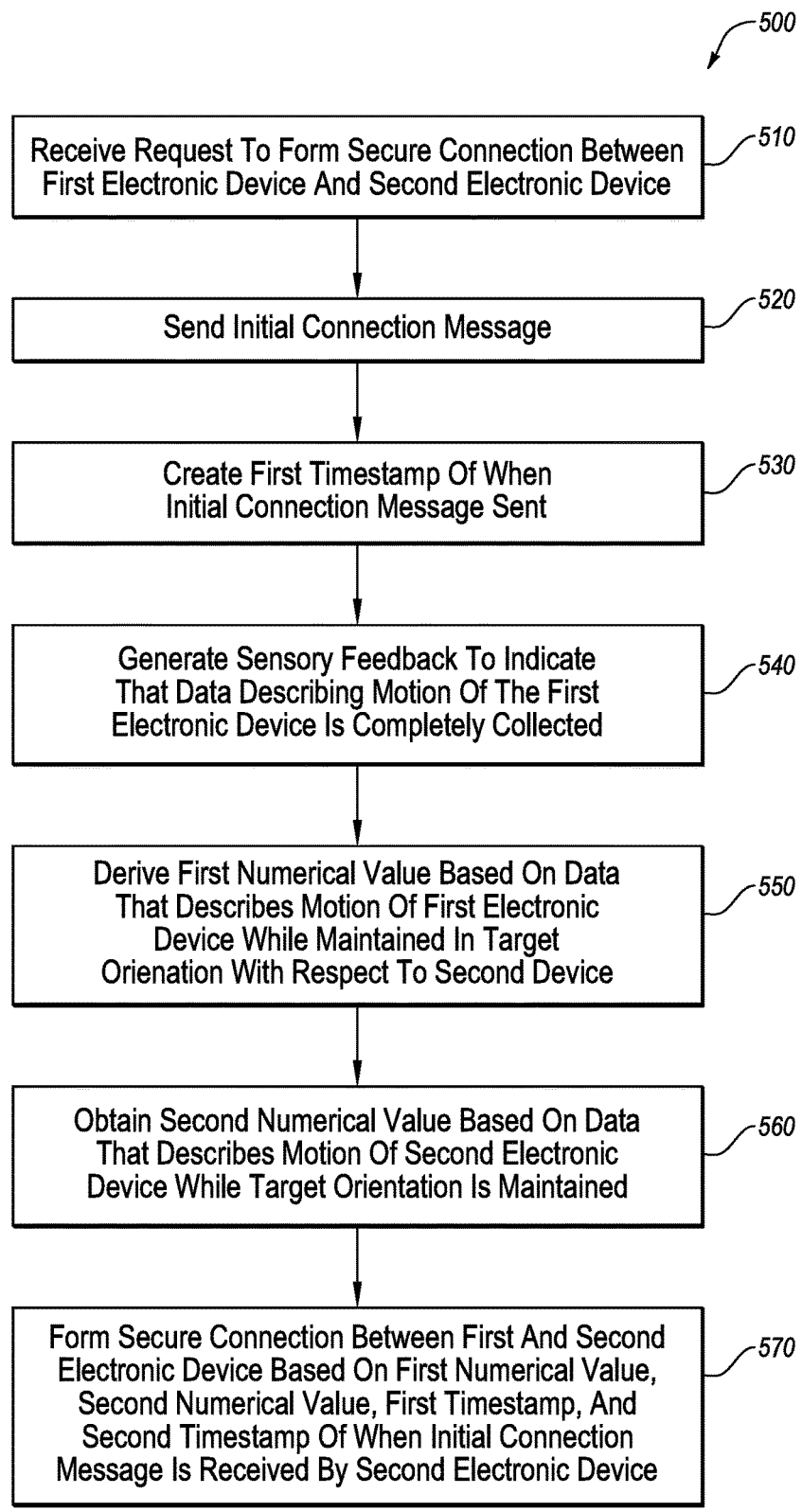
FIG. 5 illustrates an example flow diagram of example operations that may be performed by a device to form a secure communication connection.
Figure 6:
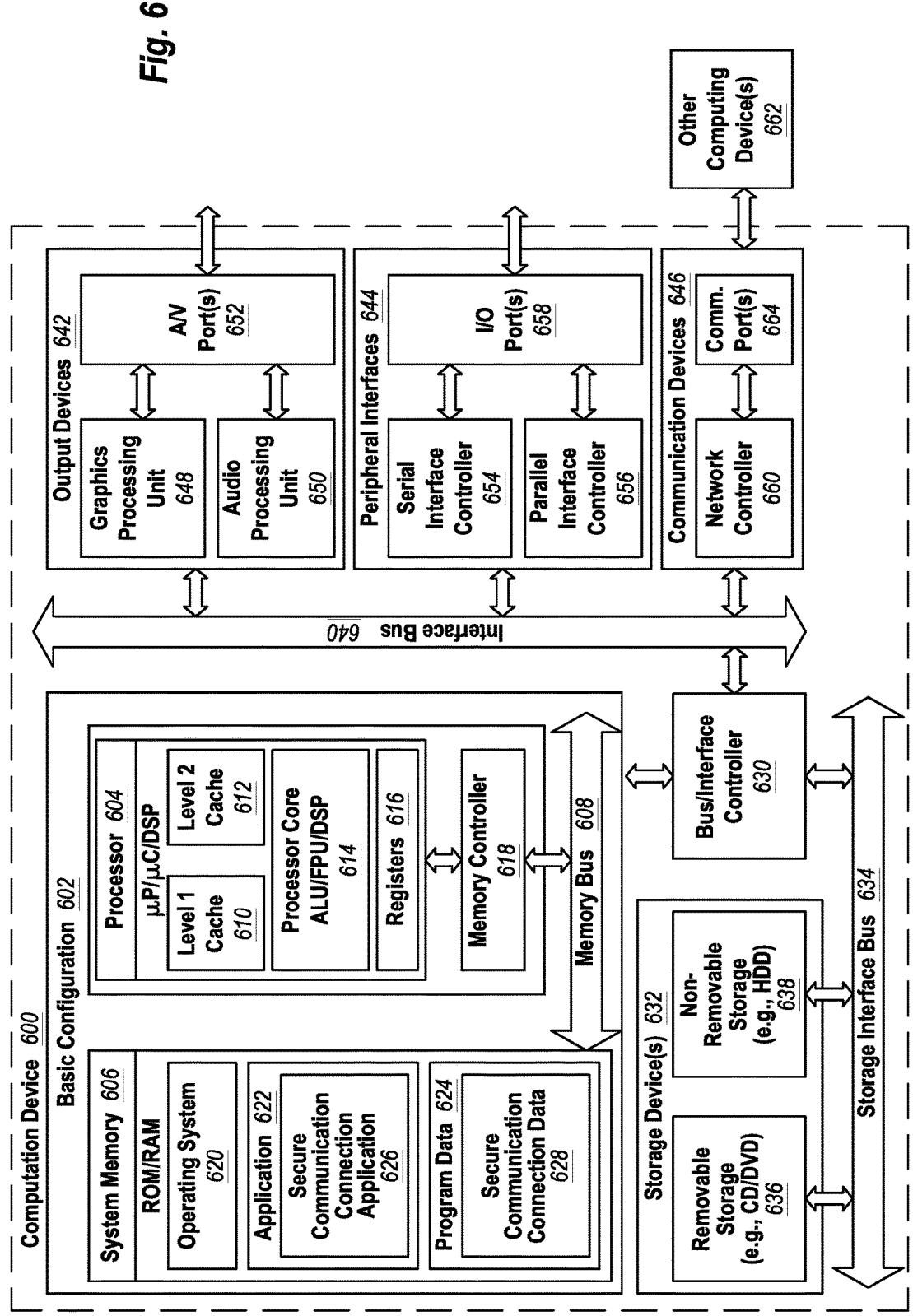
FIG. 6 is a block diagram illustrating an example computation device that is arranged to form a secure communication connection or to direct one or more operations in the formation of a secure communication connection; all arranged in accordance with at least some embodiments described herein.

The processor 210 may be implemented as described with respect to the processor 604 of FIG. 6, and may be configured to perform or control performance of any of the operations described in the present disclosure, for example, at least some of the operations described in FIGS. 3, 4, and 5. The memory 220 may be implemented as described with respect to the system memory 606 or storage devices 632 of FIG. 6, and may be configured to store any of the data described in the present disclosure or computer-executable instructions to perform any of the operations described in the present disclosure, for example, the operations described in FIGS. 3, 4, and 5.

The communication device 230 may be implemented as described with respect to the communication devices 646 of FIG. 6, and may allow, facilitate, or take part in communication between electronic devices. For example, the communication device 230 may advertise to other devices that the computation device 200 may be available to form a secure communication connection. Additionally or alternatively, the communication device 230 may send or receive a message that requests formation of a secure communication connection. The communication device 230 may also be configured to transmit or receive security messages. The communication device 230 may also be configured to transmit or receive information over a secure communication connection after establishment of that secure communication connection. In these and other embodiments, the communication device 230 may be configured to communicate wirelessly, and may establish a secure communication connection based on one or more standards, such as BLUETOOTH® technology. Additionally or alternatively, the secure communication connection may be established based on a variation or alteration to one or more standards. For example, a numerical value or combined numerical value may replace one or more portions of a security message used to establish a secure communication connection using BLUETOOTH® technology. The communication device 230 may also be configured to communicate wirelessly using other wireless communication techniques, for example, IEEE 802.11, optical, infrared, ultrasonic, ZIGBEE®, etc. technology.

The motion sensor 240 may be implemented as one or more of the output devices 642 and/or peripheral interfaces 644 and/or some other device or additional device of FIG. 6. The motion sensor 240 may be implemented as one or more of a gyroscope, an accelerometer, or a magnetometer, or any combination of any of the foregoing or other type of sensor(s). The motion sensor 240 may be configured to generate data based on motion that is sensed. For example, the motion sensor 240 may vary in an electro-magnetic value (e.g., voltage, current, magnetic field, etc.) when any of motion, acceleration, velocity, etc. occurs. The motion sensor 240 may sense at least two degrees of freedom of motion, or may sense up to six degrees of freedom, for example, motion in each of three Cartesian coordinate axes directions, and rotation about each of those coordinate axes. Additionally or alternatively, the computation device 200 may include multiple motion sensors such that more than three axes may be considered, for example, up to nine axes, for example, three axes for each of three motion sensors. In some embodiments, multiple sensors may be utilized as a comparison or verification for multiple points in space that move through multiple degrees of freedom of motion.

The clock 250 may be configured to track a local time of the computation device 200. The clock 250 may continuously or periodically update the local time based on a standardized time, such as with another computation device, user input, etc. The clock 250 may be configured to create a timestamp that reflects when certain events occur. For example, the clock 250 may create a timestamp when an initial connection message is sent or received, or when motion begins, ends, or when a secure communication connection is formed. In some embodiments, durations of time may be derived by the computation device 200 based on timestamps created by the clock 250. For example, an elapsed time from when an initial connection message is sent or received until motion begins may be derived. In some embodiments, the clock 250 may be implemented by using a system clock of the computation device 200.

The input device 260 may be implemented as one or more of the output devices 642 and/or peripheral interfaces 644 and/or some other device or additional device of FIG. 6. In some embodiments, the input device 260 may be configured to allow a user to interact with the computation device 200. For example, the user may invoke the input device 260 to request formation of a secure communication connection, or to begin advertising that the computation device 200 is available to form a secure communication connection. The input device 260 may be implemented as a button, touch screen, switch, keyboard, mouse, or any other feature or combination thereof that may provide input to the computation device 200.

In some embodiments, the computation device 200 may not be equipped with the input device 260, or the input device 260 may include a limited capability to input information directly and/or manually into the computation device 200. For example, the input device 260 may include a single button that may be invoked. As another example, the input device 260 may support or have limited capability for manual input of textual and/or numerical information into the computation device 200—the present disclosure provides techniques that enables such computation device 200 (having an input device 260 with limited capability) to securely communicate information.

Accordingly, the computation device 200 may be configured to facilitate the formation of a secure communication connection. Modifications, additions, or omissions may be made to the computation device 200 without departing from the scope of the present disclosure. For example, the computation device 200 may include any number of other components that may provide and support the operation of the computation device 200, some examples of which may be illustrated in FIG. 6. As another example, the computation device 200 may include a component that provides feedback, such as a vibrator, a speaker, or a display.

FIG. 3 illustrates an example swimlane diagram of a method 300 to form a secure communication connection, in accordance with at least some embodiments described in the present disclosure. The method 300 to form the secure communication connection (such as the secure communication connection 115 described above with respect to FIG. 1A) may be performed in whole or in part by one or more of the system 100 of FIGS. 1A and 1B or the computation device 200 of FIG. 2. The method 300 includes various operations, functions, or actions as illustrated by one or more of blocks 305, 310, 315, 320, 325, 330, 350, 355, 360, 365, 370, 375, and/or 380.

For this and other processes and methods disclosed herein, the operations performed in the processes and methods may be implemented in differing order. Furthermore, the depicted operations are only provided as examples, and some of the operations may be optional, combined into fewer operations, supplemented with other operations, or expanded into additional operations without detracting from the essence of the disclosed embodiments. The method 300 may begin at block 350. For convenience, operations, functions, and/or actions attributable to or performed by a first electronic device (such as the first electronic device 110 of FIGS. 1A and 1B) may be found in a first lane 301, while operations, functions, and/or actions attributable to or performed by a second electronic device (such as the first electronic device 110 of FIGS. 1A and 1B) may be found in a second lane 302. For convenience, the first electronic device may be referred to as a master device and the second electronic device may be referred to as a slave device. In FIG. 3, the arrows illustrate flow of messages from the first electronic device to the second electronic device, and vice versa, and do not necessarily illustrate flow of the method 300.

In block 350 ("Advertisement"), the second electronic device may begin or may continue advertisement that the second electronic device is available to form a secure communication connection with another electronic device, such as the first electronic device. Such advertisement may be invoked by an initialization or power-on procedure of the second electronic device, or by the invocation of some feature of the second electronic device to cause it to begin advertisement. Block 350 may be followed by block 305.

In block 305 ("Initiate Connection, Send Connection Message"), the first electronic device may initiate a connection with the second electronic device by sending an initial connection message. Such a message may be sent by the first electronic device based on a request from a user for formation of a secure communication connection at the first electronic device. In some embodiments, the message may be sent based on the sufficient proximity of the first electronic device to the second electronic device, which includes, for example, physical contact. The block 305 may be followed by block 310.

In blocks 310 ("Record Local Time Of Connection Message Send"), the first electronic device may create a timestamp that indicates when the initial connection message was sent. The timestamp of when the initial connection message was sent may be the time when the first and the second electronic devices first acknowledged each other. The timestamp may be based on the local time of the first electronic device. In these and other embodiments, the timestamp may be generated without reference to clock signals from the second electronic device and/or without communication of a clock signal to the second device. The block 310 may be followed by the block 355.

In block 355 ("Receive Connection Message"), the second electronic device may receive the initial connection message sent from the first electronic device. In some embodiments, the transmission of the initial connection message and the reception of the initial connection message may occur almost simultaneously. For example, the time difference between transmission and reception may be less than one second, and may be less than one one-hundredth of a second. The block 355 may be followed by the block 360.

In block 360 ("Record Local Time Of Connection Message Receive"), the second electronic device may create a timestamp that indicates when the initial connection message was received. The timestamp of when the initial connection message was received may be the time when the first and the second electronic devices first acknowledged each other. The timestamp may be based on the local time of the second electronic device. In these and other embodiments, the timestamp may be generated without input of clock signal from the first electronic device and/or without transmission of a clock signal from the second electronic device to the first electronic device. The block 360 may be followed by the block 315.

In block 315 ("Motion Of First Device"), the first electronic device may be moved through one or more motions (for example, the motion 140 of FIG. 1B). The motion of the first electronic device may occur while the first and the second electronic devices have been placed and maintained in a target orientation with respect to each other. Additionally or alternatively, one or more motion sensors of the first electronic device may generate data that describes the motion of the first electronic device. The block 315 may be followed by the block 365.

In block 365 ("Motion Of Second Device"), the second electronic device may be moved through one or more motions (for example, the motion 140 of FIG. 1B). The motion of the second electronic device may occur while the first and the second electronic devices have been placed and maintained in a target orientation with respect to each other. In some embodiments, because the target orientation is to be maintained, the motion of the first electronic device and the motion of the second electronic device may be substantially similar, and may be identical. For example, in some embodiments, the first and second electronic devices may be held together to maintain physical contact, and thus the target orientation, and may then be moved through the motion. In these and other embodiments, one or more motion sensors of the second electronic device may generate data that describes the motion of the second electronic device. The block 365 may be followed by the blocks 320 and 370.

In block 320 ("Create Security Message") and block 370 ("Create Security Message"), the first and second electronic devices may create a message to be exchanged to establish a secure communication connection. The security message may be based on a numerical value derived based on the data that describes the motion of the electronic device, and may also be based on the elapsed time from when the electronic devices first acknowledged each other until the motion started, or until the motion is completed. In some embodiments, a hash function or other mathematical operation may be used to generate one or more numerical values that may be part of or part of the basis of the security message. In these and other embodiments, some mathematical rounding may occur such that the security messages may be comparable. In some embodiments, the security message may exclude an encryption key. In these and other embodiments, the numerical value of the security message may be similar or identical for both the first and second electronic devices. In some embodiments, the security message may include an encryption key that is based on the numerical value but excludes sensitive information of the device generating the security message. The blocks 320 and 370 may be followed by the blocks 325 and 375.

In block 325 ("Exchange Security Message") and block 375 ("Exchange Security Message"), the first and the second electronic devices may exchange the security messages they created. In some embodiments, these security messages may be verifiably similar or identical because the same or nearly the same data may describe the motion of the devices and the same or nearly the same time elapsed for both devices between first acknowledging each other and some event (e.g., starting or completing motion). In some embodiments, only one of the first or the second electronic devices may send the security message and the other electronic device may verify the security message. For example, the second electronic device may transmit a security message to the first electronic device, and the first electronic device may confirm that the security message conforms with the data the first electronic device generated to describe the motion of the first electronic device and also conforms with the elapsed time that the first electronic device observed from the initial acknowledgment and the start of the motion. In these and other embodiments, the transmission and verification of the security message may exclude the transmission or exchange of security keys or other traditional cryptographic information such as sensitive information of the first and/or second electronic devices. In some embodiments, a limited portion of sensitive information may be exchanged in addition to the security message. The blocks 325 and 375 may be followed by the blocks 330 and 380.

In block 330 ("Establish Secure Connection") and block 380 ("Establish Secure Connection"), a secure communication connection may be established between the first and the second electronic device based on the security messages exchanged and/or transmitted.

Modifications, additions, or omissions may be made to the method 300 without departing from the scope of the present disclosure. For example, the security message may be based on data that describes the motion of the respective electronic device, based on elapsed time, a time stamp, or any combinations thereof.

FIG. 4 illustrates an example flow diagram of a method 400 that may be performed by a user to form a secure communication connection, in accordance with at least some embodiments described in the present disclosure. The method 400 to form the secure communication connection (such as the secure communication connection 115 described above with respect to FIG. 1A) may be performed in whole or in part by a user, for example, the user 130 of FIG. 1B. The method 400 includes various operations, functions, or actions as illustrated by one or more of blocks 410, 420, 430, 440, and/or 450.

For this and other processes and methods disclosed herein, the operations performed in the processes and methods may be implemented in a different order. Furthermore, the depicted operations are only provided as examples, and some of the operations may be optional, combined into fewer operations, supplemented with other operations, or expanded into additional operations without detraction from the essence of the disclosed embodiments. The method 400 may begin at block 410.

In block 410 ("Position First Electronic Device In Target Orientation With Respect To Second Electronic Device (e.g., Physical Contact)"), a first electronic device (such as the first electronic device 110 of FIGS. 1A and 1B) may be positioned in a target orientation with respect to a second electronic device (such as the second electronic device 120 of FIGS. 1A and 1B). For example, a user may place the second electronic device on top of and in physical contact with the first electronic device. As another example, the user may place the first electronic device proximate the second electronic device and parallel to the second electronic device. The block 410 may be followed by the block 420.

In block 420 ("Request A Secure Connection Between The First Electronic Device And The Second Electronic Device"), a request may be made for a secure communication connection to be formed between the first and second electronic devices. For example, a user may invoke a button or other feature on either or both of the first or the second electronic devices that requests that a secure communication connection be formed. As another example, a user may speak into a microphone of the first and/or the second electronic devices that requests that a secure communication connection be formed. In some embodiments, placement of the first and the second electronic devices in the target orientation may function as a request to form a secure communication connection. For example, the first and/or the second electronic device may sense, through the utilization of sensors of the respective electronic device, that the first and second electronic devices are in proximity to each other and in a target orientation. Based on the proximity and/or target orientation of the electronic devices, the first and/or the second electronic devices may recognize a request to form a secure communication connection. The block 420 may be followed by the block 430.

In block 430 ("Move First And Second Electronic Devices While The Devices Are In The Target Orientation"), the first and second electronic devices may be moved through a motion while maintained in the target orientation. Such motion may include, for example, up to six degrees of freedom of motion. The motion may also extend for a threshold duration, for example, at least one half of a second, one second, two seconds, or ten seconds. An example may include the first and the second electronic devices held together in one hand of a user, and movement of both electronic devices together through a single, identical motion through at least two degrees of freedom of motion for a threshold duration. The block 430 may be followed by the block 440.

In block 440 ("Receive Sensory Feedback That Data For A Secure Connection Is Completely Collected"), sensory feedback may be received signifying complete or near-complete collection of the data used for forming a secure communication connection between the first and the second electronic devices. For example, if the secure communication connection is based at least in part on data that describes the motion of the first electronic device, the first electronic device may provide sensory feedback to the user after the first electronic device moves for the threshold duration and passes through the minimum number of degrees of freedom of motion. Such sensory feedback may include, for example, a visual feedback (e.g., a list of requirements on a display that may be checked off as each requirement is met, or a light that flashes), an auditory sound (e.g., a beep or ding, or the vocal term "completed"), a tactile sensation (e.g., vibration), or any combination of any of the foregoing or other sensory feedback. The block 440 may be followed by the block 450.

In block 450 ("Operate The First Electronic Device While The First Electronic Device And The Second Device Share A Secure Connection"), the first electronic device may be operated while sharing a secure communication connection with the second electronic device, for example, a user may operate the first electronic device. In some embodiments, the operation of the first electronic device may include automatic operations taken by the first electronic device without direct input from a user.

Modifications, additions, or omissions may be made to the method 400 without departing from the scope of the present disclosure. For example, the block 440 may be completely omitted. As another example, at block 450, rather than the operation of the first electronic device, the second electronic device may be operated, or both the first and the second electronic devices may be operated.

FIG. 5 illustrates an example flow diagram of a method 500 that may be performed by a device in forming a secure communication connection, in accordance with at least some embodiments described in the present disclosure. The method 500 to form the secure communication connection (such as the secure communication connection 115 described above with respect to FIG. 1A) may be performed in whole or in part by a computation device or an electronic device, for example, the first electronic device 110 or the second electronic device 120 of FIGS. 1A and 1B, the computation device 200 of FIG. 2, or the computation device 600 of FIG. 6. The method 500 includes various operations, functions, or actions as illustrated by one or more of blocks 510, 520, 530, 540, 550, 560, and/or 570.

For this and other processes and methods disclosed herein, the operations performed in the processes and methods may be implemented in different orders. Furthermore, the depicted operations are only provided as examples, and some of the operations may be optional, combined into fewer operations, supplemented with other operations, or expanded into additional operations without detraction from the essence of the disclosed embodiments. While described with reference to a first electronic device, such a reference is only for convenience and any electronic or computing device may be the first and/or the second electronic device. The method 500 may begin at block 510.

In block 510 ("Receive Request To Form Secure Connection Between First Electronic Device And Second Electronic Device"), a request may be received to form a secure communication connection between a first electronic device (such as the first electronic device 110 of FIGS. 1A and 1B) and a second electronic device (such as the second electronic device 120 of FIGS. 1A and 1B). For example, the first electronic device may include a feature or button at which it receives a request from a user to form a secure communication connection. As another example, the first electronic device may receive a request from the second electronic device that requests formation of a secure communication connection. Such a request may be transmitted wirelessly, for example, as an advertisement that the second electronic device is available to form a secure communication connection. The block 510 may be followed by the block 520.

In block 520 ("Send Initial Connection Message"), an initial connection message may be sent from the first electronic device to the second electronic device. For example, based on the advertisement of the second electronic device and/or based on the user request of formation of a secure communication connection, the first electronic device may wirelessly transmit a message to the second electronic device. Such a message may be a message that indicates that the process to form a secure communication connection between a master and a slave device is to begin, with the first electronic device as a master device and the second electronic devices as a slave device. The transmission of this message may be when the first electronic device first acknowledges the second electronic device. The block 520 may be followed by the block 530.

In block 530 ("Create First Timestamp Of When Initial Connection Message Sent"), the first electronic device may create a first timestamp that indicates when the initial connection message was sent. For example, using a local time of the first electronic device, the first electronic device may store the time of when the first electronic device and the second electronic device first acknowledge each other. Additionally or alternatively, the first electronic device may store the timestamp such that the time elapsed from when the first and the second electronic devices first acknowledged each other may be determined. For example, the elapsed time may include the time elapsed until motion of the first electronic devices starts, or until motion of the first electronic device stops, or until data describing the motion of the first electronic device used in the formation of the secure communication connection is completely collected. In a similar manner, the second electronic device may create a second timestamp of when the initial connection message is received, and may be utilized in a similar manner. The block 530 may be followed by the block 540.

In block 540 ("Generate Sensory Feedback To Indicate That Data Describing Motion Of The First Electronic Device Is Completely Collected"), the first electronic device may generate sensory feedback to indicate complete collection of the data describing motion of the first electronic device. For example, a user may move the first and the second electronic devices, while maintained in a target orientation, through a target number of degrees of freedom of motion and/or a threshold duration of motion. While doing so, sensors of the first electronic device may generate data that describes the motion of the first electronic device. After the first electronic device collects sufficient data to describe the motion of the first electronic device to form the secure communication connection, the first electronic device may generate sensory feedback to indicate to the user that the motion may stop. Some examples of such sensory feedback are described with respect to block 440 of FIG. 4. The block 540 may be followed by the block 550.

In block 550 ("Derive First Numerical Value Based On Data That Describes Motion Of First Electronic Device While Maintained In Target Orientation With Respect To Second Device"), the first electronic device may derive a first numerical value based on the data that describes the motion of the first electronic device while the first electronic device is maintained in the target orientation with respect to the second electronic device. For example, the data generated by the sensors of the first electronic device may be combined, hashed, and/or put through a mathematical operation to derive a number based on the data. In some embodiments, this numerical value may also be combined with the timestamp of when the first and the second electronic device first acknowledged each other and/or the time elapsed from when they first acknowledged each other until the motion started, ended, or some other event. The block 550 may be followed by the block 560.

In block 560 ("Obtain Second Numerical Value Based On Data That Describes Motion Of Second Electronic Device While Target Orientation Is Maintained"), the first electronic device may obtain a second numerical value based on data that describes motion of the second electronic device while the target orientation is maintained. For example, the second electronic device may derive the second numerical value in a similar or identical manner to how the first electronic device derives the first numerical value. The second numerical value or a message based on the second numerical value may be transmitted from the second electronic device to the first electronic device. For example, a security message may be transmitted from the second electronic device to the first electronic device that is based on the second numerical value. The second electronic device may also combine the second numerical value with the timestamp of when the first and second electronic devices first acknowledged each other or the elapsed time to some event after when the electronic devices first acknowledged each other. Such a combined second numerical value may additionally or alternatively be transmitted to the first electronic device, or a security message may be additionally or alternatively based on the combined second numerical value. The block 560 may be followed by the block 570.

In block 570 ("Form Secure Connection Between First And Second Electronic Device Based On First Numerical Value, Second Numerical Value, First Timestamp, And Second Timestamp Of When Initial Connection Message Is Received By Second Electronic Device"), a secure communication connection may be formed between the first and second electronic devices based on at least one of a variety of factors. Such factors may include the first numerical value, the second numerical value, the first timestamp, a time elapsed from the first timestamp to some event, the second timestamp, or a time elapsed from the second timestamp to some event. For example, the secure communication connection may be based on one message from the second electronic device to the first electronic device that includes the second numerical value that describes motion of the second electronic device combined with the time elapsed from when the first and second electronic devices first acknowledged each other until the motion of the second device was completed. In such an embodiment, the secure communication connection may be based at least in part on the first timestamp as the first electronic device uses the first timestamp to determine the elapsed time until the motion of the first electronic device was completed to validate the security message of the second electronic device. As another example, the secure communication connection may be based on exchanged security messages between the first and second electronic devices based on the first and the second numerical values, respectively. Information and other content can be exchanged between the first and second electronic devices, after establishing the secure communication connection between them.

Modifications, additions, or omissions may be made to the method 500 without departing from the scope of the present disclosure. For example, the block 540 may be omitted. As another example, the secure communication connection formed in block 570 may be based on fewer or more of the numerical values or other pieces of information identified in block 570. As another example, the method 500 may include an operation directed towards one or more sensors of the first electronic device that generates data describing motion of the first electronic device.

FIG. 6 is a block diagram illustrating an example computation device 600 that is arranged to form a secure communication connection, arranged in accordance with at least some embodiments described herein. The computation device 600 may represent an example configuration of the electronic devices 110 and 120 of FIGS. 1A and 1B, and the computation device 200 of FIG. 2. In a very basic configuration 602, the computation device 600 typically includes one or more processors 604 and a system memory 606. A memory bus 608 may be used for communicating between the processor 604 and the system memory 606.

Depending on the desired configuration, the processor 604 may be of any type including, but not limited to, a microprocessor (µP), a microcontroller (µC), a digital signal processor (DSP), or any combination thereof. The processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP core), or any combination thereof. An example memory controller 618 may also be used with processor 604, or in some implementations memory controller 618 may be an internal part of processor 604.

Depending on the desired configuration, the system memory 606 may be of any type including, but not limited to, volatile memory (such as RAM), non-volatile memory (such as ROM, flash memory, etc.), or any other type of non-transitory computer-readable medium and any combination thereof. The system memory 606 may include an operating system 620, one or more applications 622, and program data 624. The application 622 may include a secure communication connection application 626 that may include instructions (executable by a processor such as the processor 604) pertaining to establishing a secure communication connection, such as receiving a user request to form a secure communication connection, analyzing motion sensor data to derive a numerical value, providing instructions to a user, and the like, as described above. The program data 624 may include secure communication connection data 628 that may be useful for establishing a secure communication connection, such as motion sensor data, numerical values, or security keys like public keys and private keys, as is described herein. In some embodiments, the application 622 may be arranged to operate with the program data 624 on the operating system 620 such that the secure communication connection may be formed. This described basic configuration 602 is illustrated in FIG. 6 by those components within the inner dashed line.

The computation device 600 may include additional features or functionality, and additional interfaces to facilitate communications between the basic configuration 602 and any required devices and interfaces. For example, a bus/interface controller 630 may be used to facilitate communications between the basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disk (CD) drives or digital versatile disk (DVDs) drives, solid state drives (SSDs), and tape drives to name a few. Example computer storage media may include volatile and nonvolatile, removable and non-removable media implemented in any method or technology for storage of information, such as computer-readable instructions, data structures, program modules, or other data.

System memory 606, removable storage devices 636, and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computation device 600. Any such computer storage media may be part of the computation device 600.

The computation device 600 may also include an interface bus 640 for facilitating communication from various interface devices (e.g., output devices 642, peripheral interfaces 644, and communication devices 646) to the basic configuration 602 via the bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that includes one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media," as used herein, may include both storage media and communication media.

The computation device 600 may be implemented as a portion of a small-form factor portable (or mobile) electronic device such as a cell phone, a personal data assistant (PDA), a personal media player device, a wireless web-viewing device, a smart timekeeping device (e.g., watch) or other wearable device, a personal headset device, an electronic pen, a camera, a shoe, sporting accessories, a speaker, a weight scale, a keyboard, a mouse, an application-specific device, or a hybrid device that includes any functions of the above devices. The computation device 600 may also be implemented as a personal computer including both laptop computer and non-laptop computer configurations.

The present disclosure is not to be limited in terms of the particular embodiments described herein, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The present disclosure is not limited to particular methods, reagents, compounds, compositions, or biological systems, which can, of course, vary. The terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Further, if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that include A alone, B alone, C alone, A and B together, A and C together, B and C together, and/or A, B, and C together, etc.). Additionally, virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, the disclosure is also thereby described in terms of any individual member or subgroup of members of the Markush group.

For any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. Also all language such as "up to," "at least," and the like may include the number recited and refer to ranges which can be subsequently broken down into sub ranges as discussed above. Finally, a range may include each individual member. Thus, for example, a group having 1-3 cells may refer to groups having 1, 2, or 3 cells. Similarly, a group having 1-5 cells refers to groups having 1, 2, 3, 4, or 5 cells, and so forth.

From the foregoing, various embodiments of the present disclosure have been described herein for purposes of illustration, and various modifications may be made without departing from the scope and spirit of the present disclosure. Accordingly, the various embodiments disclosed herein are not intended to be limiting, with the true scope and spirit being indicated by the following claims.

What is claimed is:

1. A method, comprising:
   receiving a request to form a secure communication connection between a first electronic device and a second electronic device;
   sending an initial connection message from the first electronic device to the second electronic device;
   creating a first timestamp of when the initial connection message is sent;
   deriving a first numerical value based on data that describes motion of the first electronic device, wherein the motion of the first electronic device includes at least two degrees of freedom of motion while the first electronic device is maintained in a target orientation with respect to the second electronic device, and wherein the target orientation includes physical contact;
   obtaining a second numerical value based on data that describes motion of the second electronic device, wherein the motion of the second electronic device includes at least two degrees of freedom of motion while the first electronic device is maintained in the target orientation with respect to the second electronic device; and
   forming the secure communication connection between the first electronic device and the second electronic device based on a first message that includes the first numerical value and the first timestamp, and a second message that includes the second numerical value and a second timestamp of when the initial connection message is received by the second electronic device.

2. The method of claim 1, wherein the first numerical value and the second numerical value are approximately equal.

3. The method of claim 1, wherein the first electronic device and the second electronic device are moved approximately simultaneously through approximately identical motions.

4. The method of claim 1, wherein the data that describes the motion of the first electronic device includes at least nine axes of motion based on four degrees of freedom of motion.

5. The method of claim 1, wherein forming the secure communication connection includes forming the secure communication connection through BLUETOOTH technology.

6. The method of claim 1, wherein forming the secure communication connection further comprises replacing a private key with the first numerical value.

7. The method of claim 1, wherein the data that describes the motion of the first electronic device is generated by one or more motion sensors, and wherein the one or more motion sensors include one or more of a gyroscope, an accelerometer, or a magnetometer.

8. The method of claim 1, further comprising generating sensory feedback to indicate that the data upon which the first numerical value is based is completely collected.

9. The method of claim 1, wherein sending the initial connection message from the first electronic device to the second electronic device includes sending the initial connection message to a second electronic device that has limited capability to manually and directly enter data into the second electronic device.

10. The method of claim 1, wherein forming the secure communication connection is further based on an elapsed time from the first timestamp until the motion of the first electronic device is started.

11. A first electronic device, comprising:
    an input device configured to receive a request to form a secure communication connection between the first electronic device and a second electronic device;
    one or more motion sensors;
    one or more processors coupled to the input device and to the one or more sensors; and
    a non-transitory computer-readable medium coupled to the one or more processors and that includes computer-readable instructions stored thereon that are executable by the one or more processors to perform or control performance of operations, the operations comprising:
    in response to the request to form the secure communication connection, determine a first numerical value based on data from the one or more motion sensors that describes motion of the first electronic device as the first electronic device is moved through at least two degrees of freedom of motion while maintained in a target orientation with respect to the second electronic device, wherein the target orientation includes physical contact;
    receive a second numerical value from the second electronic device based on data that describes motion of the second electronic device, wherein the motion of the second electronic device includes at least two degrees of freedom of motion while the first electronic device is maintained in the target orientation with respect to the second electronic device; and
    form the secure communication connection between the first electronic device and the second electronic device based on a first message that includes the first numerical value and a first timestamp of when an initial connection message is sent from the first electronic device to the second electronic device and a second message that includes the second numerical value and a second timestamp of when the initial connection message is received by the second electronic device.

12. The first electronic device of claim 11, further comprising a clock coupled to the one or more processors and configured to generate the first timestamp.

13. The first electronic device of claim 11, wherein the data from the one or more motion sensors includes nine axes of motion as the first electronic device is moved through four degrees of freedom of motion.

14. The first electronic device of claim 11, further comprising a feedback component configured to generate sensory feedback to indicate that the data upon which the first numerical value is based is completely collected.

15. The first electronic device of claim 11, wherein the one or more motion sensors includes one or more of a gyroscope, an accelerometer, or a magnetometer.

16. A method, comprising:
    positioning a first electronic device in a target orientation with respect to a second electronic device;
    moving the first electronic device and the second electronic device in at least two degrees of freedom of motion while the first electronic device is maintained in the target orientation with respect to the second electronic device; and operating the first electronic device while the first electronic device and the second electronic device share a secure communication connection, wherein the secure communication connection is based on a first message that includes a first numerical value and a timestamp of when the first electronic device and the second electronic device first acknowledged each other, and based on a second message that includes a second numerical value and the timestamp, wherein the first numerical value is based on data that describes the movement of the first electronic device while maintained in the target orientation, and wherein the second numerical value is based on data that describes the movement of the second electronic device while the first electronic device is maintained in the target orientation with respect to the second electronic device.

17. The method of claim 16, wherein:

positioning the first electronic device in the target orientation with respect to the second electronic device comprises placing the first electronic device and the second electronic device in physical contact in the target orientation; and moving the first electronic device and the second device in the at least two degrees of freedom of motion while the first electronic device is maintained in the target orientation comprises maintaining physical contact between the first electronic device and the second electronic device.

18. The method of claim 16, wherein the data that describes the movement of the first electronic device is approximately equal to the data that describes the movement of the second electronic device, and the movement of the first electronic device and the movement of the second electronic device occur approximately simultaneously and are approximately identical movements.

19. The method of claim 16, further comprising establishing the secure communication connection through BLUETOOTH technology.

20. The method of claim 19, wherein the first numerical value replaces a private key in formation of the secure communication connection.

21. The method of claim 16, wherein the data that describes the movement of the first electronic device is generated by one or more motion sensors, and wherein the one or more motion sensors includes one or more of a gyroscope, an accelerometer, or a magnetometer.

22. The method of claim 21, wherein moving the first electronic device and the second electronic device includes moving the first electronic device and the second electronic device in four degrees of freedom of motion, and wherein the one or more motion sensors generate data that includes at least nine axes of motion.

23. The method of claim 16, wherein moving the first electronic device includes moving the first electronic device for between approximately one half of a second and ten seconds.

24. The method of claim 16, further comprising receiving sensory feedback from the first electronic device to indicate that the data upon which the first numerical value is based is completely collected.

25. The method of claim 16, wherein positioning the first electronic device in the target orientation with respect to the second electronic device includes positioning the first electronic device in the target orientation with respect to a second electronic device that has limited capability to manually and directly enter data into the second electronic device.

26. The method of claim 16, further comprising requesting the secure communication connection prior to moving the first electronic device and the second electronic device.

27. A first electronic device, comprising:

an input device configured to receive a request to form a secure communication connection between the first electronic device and a second electronic device;

one or more motion sensors configured to sense motion of the first electronic device in at least two degrees of freedom of motion while the first electronic device is maintained in a target orientation with respect to the second electronic device, and convert the sensed motion into data that describes the sensed motion;

a communication device configured to communicate with the second electronic device and via which a secure communication connection is formed, wherein the communication device is configured to receive a second numerical value based on data that describes motion of the second electronic device as the second electronic device is moved through at least two degrees of freedom of motion while the first electronic device is maintained in the target orientation with respect to the second electronic device; and one or more processors coupled to the input device and to the one or more motion sensors, wherein the one or more processors are configured to perform or control performance of: in response to the request to form the secure communication connection, determine a first numerical value based on the data that describes the sensed motion, and form the secure communication connection between the first electronic device and the second electronic device via the communication device based on a first message that includes the first numerical value and a timestamp of when the first electronic device and the second electronic device first acknowledged each other and based on a second message that includes the second numerical value and the timestamp.

28. The first electronic device of claim 27, further comprising a clock coupled to the one or more processors and configured to generate the timestamp.

29. The first electronic device of claim 27, further comprising a feedback component configured to generate sensory feedback to indicate that the data upon which the first numerical value is based is completely collected.

* * * * *